Nov. 3, 1925.  1,560,251
A. R. DE ROUVILLE ET AL
AUTOMOBILE LOCKING DEVICE FOR FORD TRANSMISSION
Filed June 6, 1924
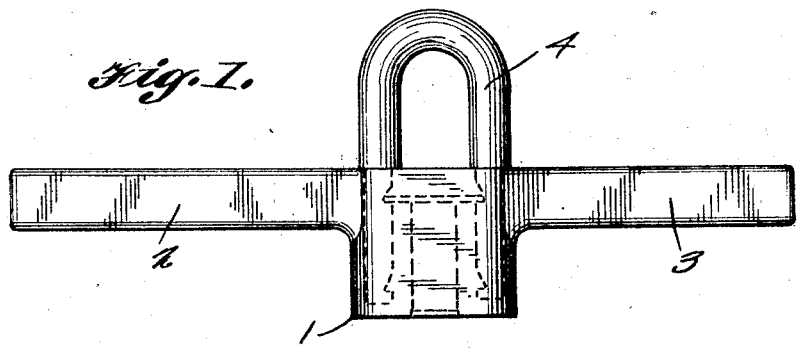
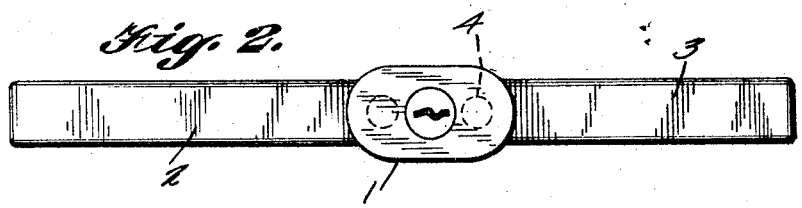
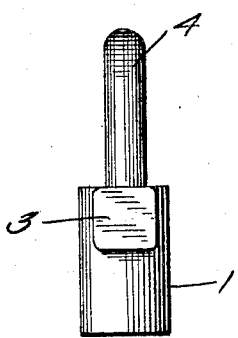
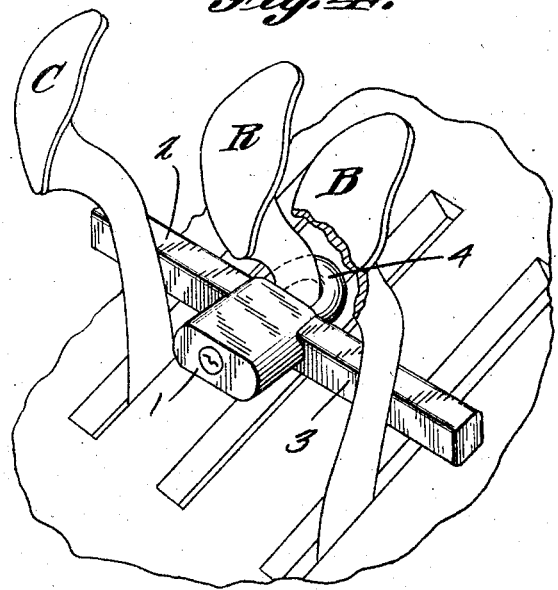

Patented Nov. 3, 1925.

1,560,251

UNITED STATES PATENT OFFICE.

ANDREW R. DE ROUVILLE AND JOHN G. MILLER, OF ALBANY, NEW YORK.

AUTOMOBILE LOCKING DEVICE FOR FORD TRANSMISSION.

Application filed June 6, 1924. Serial No. 718,330.

*To all whom it may concern:*

Be it known that we, ANDREW R. DE ROUVILLE, citizen of the United States, residing at 8 Boll Avenue, Albany, in the county of Albany and the State of New York, and JOHN G. MILLER, citizen of the United States, residing at 134 Clinton Street, Albany, in the county of Albany and the State of New York, have invented certain new and useful Improvements in an Automobile Locking Device for Ford Transmission, of which the following is a specification.

This invention relates to improvements in locks, particularly adapted for locking the foot pedals of an automobile to prevent unauthorized use thereof.

A further object is to provide a lock that clamps the foot pedal of an automobile in such a position so as to make it impossible to operate the transmission thereof.

A further object is to provide a locking means for foot pedals that can be applied thereto in an expeditious manner and consists of a minimum number of parts to accomplish the desired purpose.

This invention also consists in certain other features of construction and in the combination and arrangement of the several parts, to be hereinafter fully described, illustrated in the accompanying drawings and specifically pointed out in the appended claim.

In describing our invention in detail, reference will be had to the accompanying drawings wherein like characters denote like or corresponding parts throughout the several views, and in which:—

Figure 1 is a side elevation of the lock forming the subject matter of the present invention.

Figure 2 is a bottom plan view thereof.

Figure 3 is an edge view.

Figure 4 is a perspective view showing the lock in applied position to the operating pedals of an automobile of the well known make to which the lock is primarily designed to be associated.

Referring to the drawings in detail the letter C indicates the clutch pedal of a transmission system of well known make of an automobile, R the reverse pedal and B the brake pedal.

As shown in Figure 4 of the drawings the device forming the subject matter of the present invention is arranged in applied position to the pedals and in a manner to lock the pedals against operation. The reference numeral 1 indicates the body portion of the device and which also provides a lock housing of a key actuated lock mechanism. Extending from diametrically opposite sides adjacent one end of the body are a pair of elongated arms 2 and 3 which are adapted to engage the rear side of the clutch and brake pedals as shown, while the body 1 engages the front of the reverse pedal, and by this construction and arrangement it will be seen that the pedals are arranged in parallelism and locked in such a position by a shackle 4 which is of the usual U-shaped construction and surrounds the reverse pedal as shown. The shackle 4 may be associated with the body 1 and with the lock mechanism in any well known manner whereby the locking device may be expeditiously applied to the pedals. The operation of the device is extremely simple and is applied to the pedals by arranging the reverse pedal in operative position whereby the body 1 retains the pedal in such position by the arms 2 and 3 engaging in the underside of the clutch and brake pedals as above set forth. The shackle 4 being arranged about the reverse pedal and snapped to locked position as will be readily apparent.

It is thought from the foregoing description that the advantages and novel features of our invention will be readily apparent.

We desire it to be understood that we may make changes in the construction and in the combination and arrangement of the several parts, provided that such changes fall within the scope of the appended claim.

What we claim is:

In combination with a plurality of pedals to be locked a body for engaging the front portion of one of said pedals, a pair of arms extending from diametrically opposite sides of said body for engaging the rear side of the remaining pedals and thereby retaining said pedal first mentioned in the pressed or operative position while the remaining pedals are locked in normal position, a locking mechanism included in said body and a shackle forming a portion of the lock mechanism and surrounding the pedal first mentioned as and for the purpose specified.

In testimony whereof we affix our signatures.

ANDREW R. DE ROUVILLE.
JOHN G. MILLER.